Dec. 15, 1959  C. A. CYR  2,916,804
INSERTED BLADE CUTTER
Filed April 8, 1957
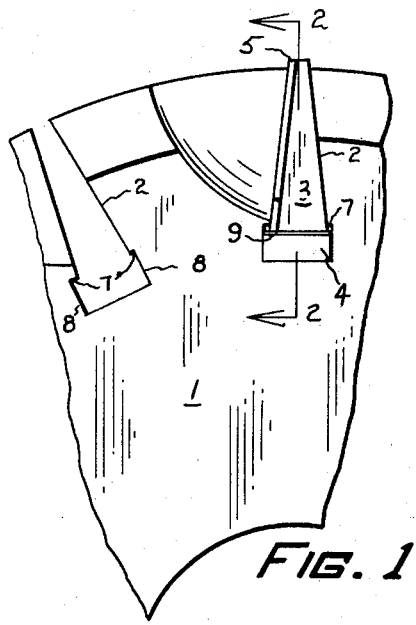
FIG. 1
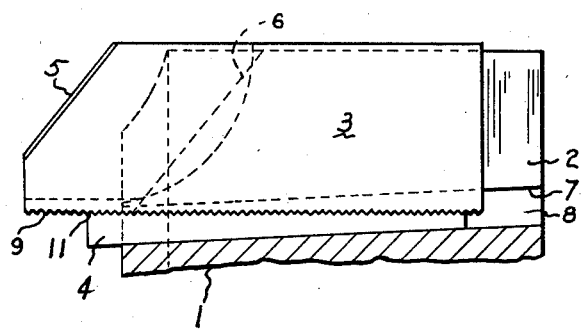
FIG. 2
FIG. 3
FIG. 4
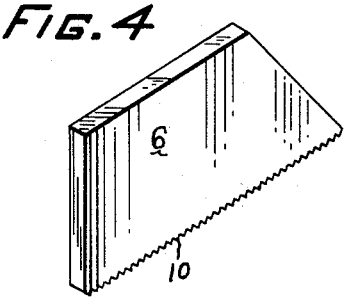
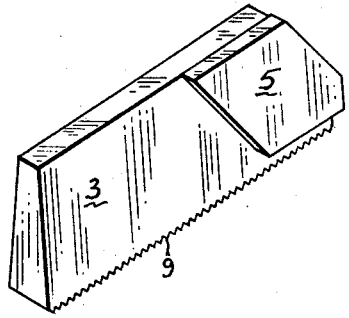
FIG. 6
FIG. 5
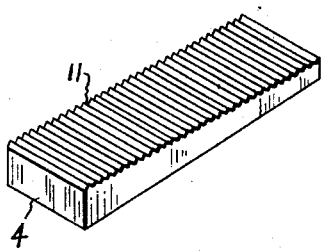
INVENTOR.
CYRILLE A. CYR
BY
*J. S. Murray*
ATTORNEY United States Patent Office 2,916,804
Patented Dec. 15, 1959

2,916,804
INSERTED BLADE CUTTER

Cyrille A. Cyr, Fraser, Mich., assignor to Wesson Tool Co., Ferndale, Mich., a corporation of Michigan Application April 8, 1957, Serial No. 651,453

2 Claims. (Cl. 29—105)

This invention relates to inserted blade cutters and particularly cutters using blades equipped with relatively hard tips such as tungsten carbide.

Use of such tips is common, it being a usual practice to machine the cutting end portions of the blades with recesses wherein the tips are inserted with one face of each thereof flush with a lateral face of the corresponding blade, the tips being brazed or otherwise rigidly secured to the blades. Machining of the described recesses entails considerable labor and some waste of expensive steel.

An object of the invention is to eliminate recessing of an inserted blade by inserting a filler plate in the blade-receiving slot of a cutter body between the tip-mounting lateral face of the blade and an opposed face of the corresponding slot, such plate and the tip being of accurately equal thickness.

Another object is to adapt the blades and filler plates to be economically stamped or otherwise cut from elongated strips of the requisite cross section, whereby a large number of the blades and strips may be accurately ground in a single operation.

Another object is to adapt an inserted blade to be locked in a slot of a cutter body by forming the blade and slot respectively with opposed faces outwardly converging at a wedging angle, and driving a wedge into the slot against the inner face of the blade to apply outward pressure to the blade and thus wedge it between said faces of the slot, and to adapt said wedge to further take effect on a filler plate which additionally occupies the slot and abuts the blade in proximity to a tip of special cutting material, such as tungsten carbide, rigidly carried by the blade.

These and various other objects are attained by the construction hereinafter described and illustrated in the accompanying drawing, wherein:

Fig. 1 is a fragmentary side elevational view of my improved cutter showing one of the blade slots empty and another occupied by a blade and associated elements.

Fig. 2 is a cross sectional view of the cutter, taken on the line 2—2 of Fig. 1.

Fig. 3 perspectively shows the blade appearing in Figs. 1 and 2.

Fig. 4 perspectively shows a filler plate such as is paired with each blade.

Fig. 5 perspectively shows a wedge for taking effect on the blade and filler plate.

Fig. 6 perspectively shows how a large number of filler plates may be cut without waste from an elongated steel strip.

In these views the reference character 1 designates a cutter body which is usually of circular form and has a series of substantially radial, circumferentially spaced slots 2 opening in its peripheral face and also in its front and back faces. Each such slot receives a blade 3 and has its opposed faces formed with a gradual outward convergency (preferably about fourteen degrees), the lateral faces of the blade having the same convergency, whereby application of a moderate outward pressure to the blade will rigidly wedge it in the slot.

To apply such outward pressure, it is preferred to form the bottom of the slot with a slight lengthwise convergency (as for example, three degrees) toward the periphery of the body 1, and to drive a wedge 4 into the slot between its bottom and the blade 3. Said wedge is of rectangular cross section and has parallel side faces and a slight convergency between its inner and outer faces, such that its inner face conforms to the slot bottom while its outer face conforms to the inner face of the blade. Thus insertion of the wedge under a moderate force will apply to the blade an adequate outward pressure to wedge the blade rigidly between the convergent walls of the slot.

Rigidly brazed or otherwise affixed to a lateral face of each blade at its cutting end portion is a tip 5 of relatively hard material, as tungsten carbide, such tip preferably having parallel lateral faces, one of which seats on the blade. Abutting said tip in an accurately flush relation with the other of said faces is a filler plate 6 which is preferably of rectangular cross section and substantially fully occupies the pocket formed between the tip-mounting face of the blade and the opposed side face of the slot 2. It is an important feature of the invention that the described filler plate is in no way secured to any other element of the construction.

In order to provide accurate guidance for the wedge 4 and to assure a like outward actuation by the wedge 4 of the blade and filler plate, it is preferred to slightly enlarge the width of the slot in proximity to its bottom, whereby the opposed faces of the slot have offsets 7, the opposed faces 8 of said enlarged portion being preferably parallel. There is adequate clearance between the offsets 7 and the wedge to afford the maximum intended insertion of the wedge without taking up such clearance. Since there is a filler plate 6 at only one side of the wedge it may appear superfluous to employ a wedge projecting beyond both sides of the blade. The particular face of the blade mounting the carbide tip and engaged by the filler plate depends, however, on the direction of rotation of the body 1 and the wedge arrangement shown lends itself to use for cutter rotation in either direction.

A row of similar and parallel serrations 9 are preferably formed on the bottom face of the blade 3 transversely thereof and like serrations 10 are provided on the inner edge of the filler plate 6, and such serrations intermesh with like serrations 11 on the outer face of the wedge 4. This permits the wedge to be so definitely applied to the blade and filler plate, prior to insertion in the slot 2, as to assure a required contact between the carbide tip and filler plate. Also the serrations facilitate such initial relative adjustment of the parts as may be necessary from time to time as a compensation for wear of the tip 5.

In addition to its economies of labor and material heretofore mentioned, the described filler plate 6 lends itself to successive cooperation with many blades, since wear imposed on such plate is trivial whereas the blade, with its carbide tip, requires rather frequent regrinding and hence must be discarded after relatively short periods of use.

Wedging of the blades in the slots of the body 1 by pressure applied to the inner faces of the blades is preferable to a lateral application of pressure since the former permits a smaller circumferential spacing of the slots and hence permits equipping a certain size of cutter with a maximum number of blades.

The described construction lends itself to initially integrally forming a large number of the plates 6 as a long strip as appears in Fig. 6. While in such form, they may be ground in one operation and may then be severed from the strip in any desired manner. A similar economy of labor is available in producing the blades 3.

What I claim is:

1. In a cutter body utilizing inserted blades in surface slots converging from the base of the slot toward the opening, a blade and lock combination comprising a blade having side walls with the same angles of convergance as the slot but narrower than the slot, a flat protuberance of cutting material on one side of said blade at one end dimensioned to fill the space between the slot walls when the blade is in operative position, a plate to lie in side relation to said blade and end to end relation to said protuberance, and wedge means underlying both said blade and said plate to urge said blade and said plate in tight locked relation in said slot.

2. An inserted blade cutter comprising a body having a peripheral face and a slot opening in and extending across such face and having opposed lateral faces converging toward the peripheral face, a blade set into said slot and having opposed faces with the same convergency as said faces of the slot, whereby the blade may be wedged in the slot under pressure directed outwardly toward said peripheral face, said blade having a cutting end portion projecting from the slot and including a cutting tip rigidly mounted upon one of said opposed faces of the blade at said end portion and formed of a material harder than the blade, a filler plate inserted between the tip-mounting face of the blade and one of said lateral faces of the slot, and a tapered wedge inserted between the blade and the bottom of the slot and forcing the blade outwardly to wedge it in the slot, said wedge engaging the inner faces of both the blade and filler plate.

References Cited in the file of this patent

UNITED STATES PATENTS

| | | |
|---|---|---|
| 1,352,688 | Peterson | Sept. 14, 1920 |
| 1,365,180 | McDonald | Jan. 11, 1921 |
| 1,934,465 | Hillner | Nov. 7, 1933 |
| 1,962,163 | Weddell | June 12, 1934 |
| 2,037,466 | Greenleaf | Apr. 14, 1936 |
| 2,076,999 | Miller | Apr. 13, 1937 |
| 2,423,419 | Stuber | July 1, 1947 |

FOREIGN PATENTS

| | | |
|---|---|---|
| 279,014 | Switzerland | Feb. 16, 1952 |
| 316,816 | Great Britain | Aug. 8, 1929 |